(12) United States Patent
Golecki (10) Patent No.: US 9,085,991 B2
(45) Date of Patent: Jul. 21, 2015

(54) PROTECTIVE COATINGS FOR CERAMIC MATRIX COMPOSITE SUBSTRATES AND METHODS FOR IMPROVING THE WEAR RESISTANCE THEREOF AND COATED ARTICLES PRODUCED THEREFROM

(75) Inventor: Ilan Golecki, Parsippany, NJ (US)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 939 days.

(21) Appl. No.: 12/614,149

(22) Filed: Nov. 6, 2009

(65) Prior Publication Data
US 2011/0111211 A1 May 12, 2011

(51) Int. Cl.
*B32B 9/00* (2006.01)
*B32B 9/04* (2006.01)
(Continued)

(52) U.S. Cl.
CPC .............. *F01D 5/288* (2013.01); *C04B 35/117* (2013.01); *C04B 35/14* (2013.01); *C04B 35/18* (2013.01); *C04B 35/185* (2013.01); *C04B 35/44* (2013.01); *C04B 35/488* (2013.01); *C04B 35/803* (2013.01); *C04B 41/009* (2013.01); *C04B 41/508* (2013.01); *C04B 41/5076* (2013.01); *C04B 41/5089* (2013.01); *C04B 41/85* (2013.01); *F01D 5/282* (2013.01); *F01D 5/284* (2013.01); *C04B 2235/5224* (2013.01); *C04B 2235/5228* (2013.01); *C04B 2235/5232* (2013.01); *C04B 2235/5256* (2013.01); *C04B 2235/5268* (2013.01); *F05D 2230/90* (2013.01); *F05D 2300/603* (2013.01); *F05D 2300/611* (2013.01); *Y02T 50/67* (2013.01);
(Continued)

(58) Field of Classification Search
CPC ....... F01D 5/288; C04B 35/14; C04B 35/803; Y10T 428/26
USPC ........... 416/241 B, 241 R; 427/374.1, 383.5, 427/397.8, 397.7; 428/220, 293.4, 446, 702
See application file for complete search history.

(56) References Cited

U.S. PATENT DOCUMENTS 5,275,984 A 1/1994 Carpenter et al.
5,948,516 A 9/1999 Kriven et al.
(Continued)

OTHER PUBLICATIONS

Safety Date Sheet, TFR Economy, RAW Chemical Distribution Limited; Jun. 12, 2002, pp. 1-3, Revision No. 1.
(Continued)

*Primary Examiner* — Jonathan Langman
(74) *Attorney, Agent, or Firm* — Ingrassia Fisher & Lorenz, P.C.

(57) ABSTRACT

Coated articles adapted to be subjected to direct and sustained mechanical contact are provided. The coated articles include a ceramic matrix composite (CMC) substrate. A solid coating is disposed directly on and adheres to the substrate during such direct and sustained mechanical contact. The solid coating is formed from a precursor comprising a liquid binder, which may be sodium silicate, a basic colloidal alumina solution, aluminum hydroxide, aluminum oxychloride, aluminum hydroxylchloride, aluminum phosphate, and phosphoric acid. The coating may also include a filler material such as solid powder, chopped fibers, and combinations thereof.

Methods for improving the wear resistance of an article made from the CMC substrates are also provided. A CMC substrate is provided and covered with a slurry. The slurry includes the liquid binder and optionally, the filler material. The slurry is consolidated, for example, by annealing to form a wear-resistant solid coating on the article.

19 Claims, 2 Drawing Sheets

(51) Int. Cl.

| | |
|---|---|
| *B32B 13/04* | (2006.01) |
| *B32B 19/00* | (2006.01) |
| *B05D 3/02* | (2006.01) |
| *F01D 5/28* | (2006.01) |
| *C04B 35/80* | (2006.01) |
| *C04B 41/00* | (2006.01) |
| *C04B 41/50* | (2006.01) |
| *C04B 41/85* | (2006.01) |
| *C04B 35/117* | (2006.01) |
| *C04B 35/14* | (2006.01) |
| *C04B 35/18* | (2006.01) |
| *C04B 35/185* | (2006.01) |
| *C04B 35/44* | (2006.01) |
| *C04B 35/488* | (2006.01) |

(52) U.S. Cl.
CPC ............ *Y02T 50/672* (2013.01); *Y10T 428/25* (2015.01); *Y10T 428/257* (2015.01); *Y10T 428/26* (2015.01)

(56) References Cited

U.S. PATENT DOCUMENTS

| | | | |
|---|---|---|---|
| 5,985,368 | A | 11/1999 | Sangeeta et al. |
| 6,110,527 | A | 8/2000 | Brun et al. |
| 6,197,424 | B1 * | 3/2001 | Morrison et al. ............. 428/402 |
| 6,528,190 | B1 | 3/2003 | Campbell et al. |
| 6,929,852 | B2 | 8/2005 | Lane et al. |
| 7,108,925 | B2 * | 9/2006 | Campbell ..................... 428/701 |
| 7,160,618 | B2 | 1/2007 | Walker et al. |
| 7,306,860 | B2 | 12/2007 | Strangman et al. |
| 7,402,347 | B2 | 7/2008 | Morrison et al. |
| 2002/0197465 | A1 * | 12/2002 | Butner et al. .............. 428/293.4 |
| 2003/0022783 | A1 * | 1/2003 | DiChiara, Jr. ................. 501/127 |
| 2003/0207155 | A1 * | 11/2003 | Morrison et al. ............. 428/699 |
| 2006/0019087 | A1 * | 1/2006 | Mazzola et al. ............. 428/323 |
| 2006/0029733 | A1 * | 2/2006 | Bhatia et al. .............. 427/248.1 |
| 2007/0207330 | A1 | 9/2007 | Tulyani et al. |
| 2008/0187767 | A1 * | 8/2008 | Tang et al. .................... 428/450 |

OTHER PUBLICATIONS

Sodium meta-Silicate, 9-Hydrate, Crystal; MSDS No. S4970, Nov. 10, 2005, pp. 1-4.
Ceramabind 642, Aremco Products, Inc.; Jul. 9, 2007, pp. 1-2.
Ceramabind 642, Aremco Products, Inc.; Feb. 12, 2009, pp. 1-4.
High Temperature Inorganic Binders, Technical Bulletin A11, Aremco Products, Inc.; pp. 1-2, Revision Jan. 2006.
High Temperature Refractory Coatings, Technical Bulletin A5-S, Aremco Products, Inc.; pp. 1-2, Revision Jan. 2006.
Material Safety Data Sheet, Metalines, Inc.; Sep. 18, 1987, pp. 1-4.

* cited by examiner

PROTECTIVE COATINGS FOR CERAMIC MATRIX COMPOSITE SUBSTRATES AND METHODS FOR IMPROVING THE WEAR RESISTANCE THEREOF AND COATED ARTICLES PRODUCED THEREFROM

TECHNICAL FIELD

The present invention relates generally to gas turbine engines and, more particularly, to protective coatings for ceramic matrix composite substrates and methods for improving the wear resistance thereof and coated articles produced therefrom that are useful for manufacturing engine components.

BACKGROUND

Gas turbine engines are subjected to high temperatures during operation and consequently include components made from refractory materials. An oxide-based ceramic matrix composite (CMC) substrate (hereinafter "oxide-based CMC substrate(s)") is one example of a high temperature structural material used for a gas turbine engine component. Such oxide-based CMC substrates have a tendency to wear at a wear surface when placed in motional or vibratory contact with metals. Such wear may cause undesirable recession, dimensional changes, loss of mass, and corresponding undesirable degradation of mechanical and thermal properties of such composites and the components and systems in which they are used.

As an example, structural components made from CMC substrates, including oxide-based CMC substrates, may be exposed to such contact when held in a metal fixture or bracket within a larger subsystem, e.g., in an engine, and more specifically in an engine which is part of an airborne system, such as an airplane. In the latter environment, the CMC substrates and metal components may also be subject to a wide range of temperatures, from below freezing 0° C. (32° F.) to above 1000° C. (1832° F.). The chemical environment may be oxidizing, resulting in the formation of oxides on the metal surfaces.

Further, for certain oxide-based CMC substrate fabric architectures, for example, a two-dimensional (2-D) fabric layup, the wear rate of the x-y, or fabric plane is highly variable with increasing contact time and/or distance traveled during the wear process. This variability in the wear rate of the oxide-based CMC substrate is due to the discrete layered structure in the thickness (or z) direction. The wear rate of unprotected oxide-based CMC substrate surfaces is therefore large, extremely variable, and not readily predictable at any given starting or intermediate condition of the wear process, when the two wear surfaces are first brought in contact or at a later stage.

The surfaces of oxide-based CMC substrates may also require protection against other materials or conditions which may be present in the use environment as described, or in other environments, for example against undesirable erosion and recession from particles. Current, commercially available oxide-based CMC substrates, fabricated by a single cycle of liquid slurry infiltration and annealing, are highly porous, with open and accessible porosity at external surfaces. This porosity aggravates the sensitivity to such harsh environments.

Ceramic matrix composite (CMC) substrates, including oxide-based ceramic matrix composite (CMC) substrates are difficult to coat successfully. Typical oxide-based CMC substrates are relatively inert chemically, and usually have no significant surface features to provide any type of mechanical lock with the coating. Furthermore, typical commercially available oxide-based CMC substrates have high (30-50%) matrix porosity, and the open, small accessible pores at the surfaces of these CMC substrates make coating from a liquid precursor very difficult. It is especially difficult to get solid coatings to adhere to oxide-based CMC substrates during direct and sustained mechanical contact, and remain adherent over the required temperature range in harsh environmental conditions. In general, the level of adhesion required from a coating subjected to mechanical stresses due to direct and sustained mechanical contact, such as in wear applications, is much higher than the level of adhesion required in applications where no direct mechanical loads are applied to the coating, such as in environmental or oxidative barrier (EBC/OBC) applications.

While bond coats are used with some coatings to ensure adhesion of the coating to a substrate surface, their use just introduces another possible failure point and complicates the coating process. A single, adherent coating which does not require a bond coat is extremely advantageous from practicality and cost effectiveness points of view. Similarly, substrate surface treatment is often performed prior to coating in order to improve adhesion. However, such surface treatment may undesirably reduce the mechanical and other functional properties of the oxide-based CMC substrates.

Accordingly, it is desirable to provide protective coatings that substantially protect CMC substrates from wear, recession, and erosion, and that are suitable for high temperature and oxidative environments, and adhere to the surface of the CMC substrate during direct and sustained mechanical contact in such environments and remain adherent over the required temperature range, and without a bond coat. In addition, it is desirable to reduce the variability in wear behavior of uncoated oxide-based CMC substrates, so as to obtain a material surface with a low and relatively constant and predictable wear rate. It is also desirable that the coating be stable, and not evaporate or decompose in the contemplated use environments. Furthermore, other desirable features and characteristics of the present invention will become apparent from the subsequent detailed description of the invention and the appended claims, taken in conjunction with the accompanying drawings and this background of the invention.

BRIEF SUMMARY

Coated articles adapted to be subjected to direct and sustained mechanical contact are provided. The coated articles comprise a substrate comprised of a ceramic matrix composite (CMC); and a solid coating disposed directly on the substrate and adhering to the substrate during such direct and sustained mechanical contact. The solid coating is formed from a precursor comprising a liquid binder selected from the group consisting of a sodium silicate, a basic colloidal alumina solution, aluminum hydroxide, aluminum oxychloride, aluminum hydroxylchloride, aluminum phosphate, and phosphoric acid ($H_3PO_4$).

Coated oxide-based ceramic matrix composite substrates are also provided. The oxide-based ceramic matrix composite substrate comprises fibers selected from the group consisting of alumina, alumina-mullite, zirconia, hafnia, yttrium-aluminum-garnet (YAG) and silica fibers, and combinations thereof. A slurry-based solid coating formed from a liquid binder comprising a sodium silicate is disposed directly on the substrate. The coating has a thickness ranging from about 5 μm to about 500 μm.

Methods of improving the wear resistance of an article comprised of a ceramic matrix composite substrate are also provided. A substrate is provided comprised of a ceramic matrix composite. The substrate is covered with a slurry. The slurry comprises a liquid binder selected from the group consisting of a sodium silicate, a basic colloidal alumina solution, aluminum hydroxide, aluminum oxychloride, aluminum hydroxylchloride, aluminum phosphate, and phosphoric acid ($H_3PO_4$). The slurry is consolidated to form a wear resistant solid coating on the article.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
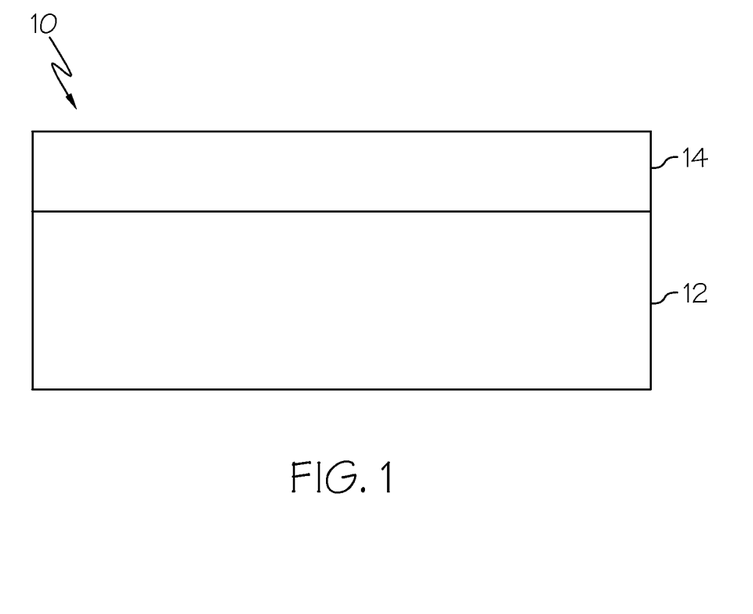
FIG. 1 is a schematic cross sectional view of a coated substrate comprising a ceramic matrix composite substrate with an overlying protective coating according to an exemplary embodiment of the present invention.

The present invention is an adherent wear-resistant protective coating that substantially protects a substrate such as a ceramic matrix composite (CMC) substrate, including an oxide-based ceramic matrix composite substrate (hereinafter "oxide-based CMC substrate(s)"), from undesirable wear. As the coating substantially reduces the wear of the substrate and shields the substrate from harsh environmental conditions, the coated substrate 10 is useful to manufacture articles such as gas turbine engine components, such as shrouds, vanes, and ducts, and other types of components that function in a high temperature and high wear environment.

FIG. 1 is a cross sectional view of a coated substrate 10, including a ceramic matrix composite substrate 12 with a protective coating 14 formed directly thereon, according to an exemplary embodiment of the present invention.

Figure 2:
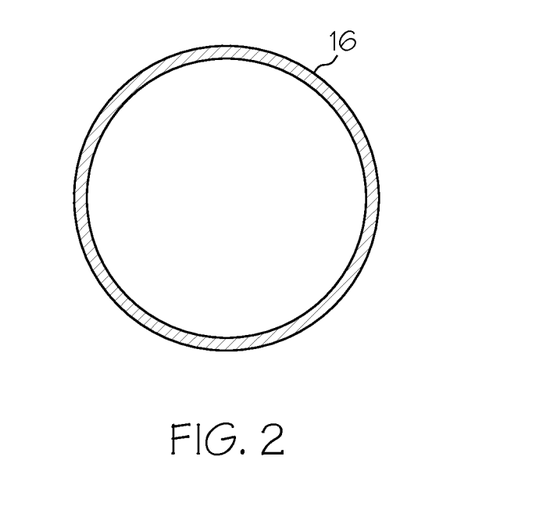
FIG. 2 is a schematic cross sectional view of an exemplary engine shroud, the surface of which is adapted to be at least partially coated (the coating not shown in FIG. 2) according to an exemplary embodiment of the present invention.

One particular engine component for which the coated substrate is useful is a shroud. An exemplary shroud component 16 that may be used in a gas turbine engine is shown in FIG. 2. Of course, the substrate 12, when protected by the protective coating 14 as described below, can also be used to manufacture other gas turbine engine components. Further, the coated substrate can be used to manufacture other components, articles and apparatuses that are subjected to high wear, high temperature, and/or chemically harsh environments during use.

Returning once again to FIG. 1, in accordance with an exemplary embodiment, the substrate 12 comprises a ceramic matrix composite (CMC) material. In an exemplary embodiment, the ceramic matrix composite comprises an oxide-based ceramic matrix composite material. Commercially available oxide-based ceramic matrix composites include alumina fibers or alumina-mullite fibers embedded in an alumina matrix or aluminosilicate matrix. Typical fibers for high temperature environments, such as typically encountered in aircraft engines, are 3M Nextel™ 610 (alumina) or 3M Nextel™ 720 (alumina-mullite) fibers.

The fibers may be bundled in multi-fiber tows, each tow typically incorporating a few hundred to a few thousand fibers. The tows are further arranged in a woven fabric, such as in a five-harness or an eight-harness weave. An oxide-based CMC preform may incorporate a sequence of such two-dimensionally (2-D) woven fabric layers, which are laid up sequentially on top of one another, in a 0/90°, 0/30/60/90°, +45/−45° or any one of many other desired relative angular alignments. Alternately, a preform may be fabricated by means of stitching or three-dimensional (3-D) weaving of fiber tows to obtain various shapes. Oxide fibrous preforms may also be made using discontinuous or chopped fibers. Typical commercial matrices in oxide-based CMC substrates contain significant residual porosity of 30-50%, and the oxide-based CMC is therefore about 15-25% porous.

The substrate 12 is not limited to alumina-fiber or alumina-mullite fiber CMC substrates. Other oxide-based CMC substrates include ones incorporating zirconia, hafnia or yttrium-aluminum-garnet (YAG), and/or silica oxide fibers. The oxide-based CMC substrate also comprises a matrix selected from the group consisting of alumina, mullite, zirconia, hafnia, yttrium-aluminum-garnet (YAG), silica, and combinations thereof.

While protection of CMC substrates including oxide-based CMC substrates and components has been described, the invention is not so limited. The protective coating as described herein may also provide protection when applied to substrates comprised of other materials, such as alumina and silicon. Exemplary alumina substrates include polycrystalline alumina (aluminum oxide) substrates having, for example, about 96% or about 99% density compared to theoretical, and sapphire (single-crystalline alumina) substrates. Exemplary silicon substrates include polycrystalline and single crystalline silicon substrates.

The precursor to the solid coating may be a slurry, comprising a liquid binder and optionally, at least one filler material. The liquid binders themselves may be considered slurries, having a predetermined percent by weight of solids therein. The liquid binders used may be water-based, and can be diluted in water or in a variety of organic solvents, such as alcohols, etc. The liquid binder may be selected from the group consisting of a sodium silicate such as sodium metasilicate hydrate (available commercially as Cerama-Bind™ 642 from Aremco Products, Inc. (Valley Cottage, N.Y.)), Pyro-Paint™ 634-AL (a basic colloidal alumina solution and/or aluminum hydroxide, also sold by Aremco Products, Inc.), aluminum oxychloride, aluminum hydroxylchloride, aluminum phosphate, phosphoric acid ($H_3PO_4$), as well as other binders, such as A1 or A2 alumina slurries (pre-mixed, acid based slurries) sold by Zyp Coatings Co. (Oak Ridge, Tenn.) or some binders sold by Cotronics Inc. (Brooklyn, N.Y.). Sodium silicate is preferred. "Liquid binder" as used herein includes both the as-produced, as-received, or as purchased liquid binder and liquid binder in a solution (diluted with water or a solvent).

The at least one filler material comprises at least one of a solid metal-oxide powder and chopped fibers. The at least one filler material is mixed with the liquid binder to create the slurry. For coating an oxide-based CMC substrate comprising, for example, alumina or alumina-mullite fibers and an alumina matrix, the solid metal-oxide powder may be an alumina powder, a non-alumina oxide powder, for example, mullite, and combinations thereof. For reasons of thermal and chemical compatibilities, alumina powders are preferred for use as filler material for the coatings on oxide-based CMC substrates which are comprised of primarily alumina in both fibers and matrices. Thermal expansion mismatches between the oxide-based CMC substrate and the solid coating formed from the liquid binder may be reduced or eliminated by loading the liquid binder with a powder having a thermal expansion that matches that of the substrate more closely than a solid coating formed from the liquid binder only. If filler material is added to the liquid binder, the weight-based ratios of powder filler material to liquid binder may be in the range of between 0 to about 5. As used herein, "between" means more than 0.

The powders used as filler material may comprise particles having sizes from about 0.001 µm to about 100 µm, preferably 0.01 µm to 30 µm. In addition to a single size powder, a mixture of at least two different-sized powders may be used in a range of proportions to obtain desired coating properties. Further, mixtures of alumina and non-alumina oxide or other powders can also be used. Chopped fibers may also be used as a filler material. For example, chopped alumina, chopped mullite, or chopped alumina-mullite fibers may be used. Combinations of different fibers, as well as fibers and one or more powders, may also be used as filler material.

The liquid binder may be mixed with the filler material to create a relatively homogenous liquid slurry having a viscosity permitting ready application and coverage of a substrate surface to achieve coverage in the desired range of areal density. Having the appropriate viscosity is important in terms of methodology and ease of application onto the substrate surfaces. If the viscosity is too low, i.e., below one centipoise (cp), which is the viscosity of water at 20° C., the slurry flows very easily, and effective coating may be difficult, as the slurry would tend to flow off the substrate. Additionally, as oxide-based CMC substrates contain surface and bulk porosity, at least a portion of the liquid binder may be quickly absorbed within the pores of the substrate, and thus may not be as effective as a binder in the slurry. On the other hand, if the slurry viscosity is too high, the slurry may hardly flow or not flow at all and would be more akin to a paste or even a solid. In the latter case, application would be less facile and adhesion may be degraded. The appropriate viscosity can be determined by the skilled person on the basis of routine experiments.

Viscosity of the slurry increases with the amount of powder added to the liquid binder. As different liquid binders have different initial viscosities, the powder to liquid binder ratios may be adapted to suit the specific liquid binders, as well as to suit the specific powder particle sizes. Varying the powder to liquid ratio enables one to obtain slurries having a wide range of viscosities. For equal powder weights, and equal powder to liquid ratios, higher slurry viscosities resulted when a smaller particle-size powder was used. In addition to the use of such liquid binders as described, the liquid binders may be diluted in water or other solvents prior to or during the addition of the powder filler material.

Viscosity may also be controlled by slurry temperature. Viscosity of liquids generally decreases with increasing temperature. In some cases, for example, when a chemical reaction between at least two components in the slurry may occur, the viscosity of the slurry may increase with temperature. The slurry temperature may be controlled, for example, by at least partially immersing a vessel in which the slurry is located within a larger vessel filled with a liquid and controlling the temperature of the liquid in the larger vessel. To control evaporation during heating of the slurry, the vessel containing such slurry may be partially or completely closed with a cap or other means.

Homogenization of the slurry is achieved by rotation, stirring and other known manual or machine-based means. For example, one can use a blender or a mixer operating at high rotation speeds of the order of 100-4000 rpm, in order to obtain more homogeneous slurries and to control or reduce residual air bubbles. After homogenization, the slurry may be applied at ambient temperature onto the surface of the CMC substrate. Optionally, the slurry application can be made at a temperature different than room temperature, to better control the viscosity, for example. The substrate should preferably be at about the same temperature as the slurry. The slurry may be applied by brushing, dipping (with or without concurrent rotation), controlled pouring, spraying, and the like. Optionally the still liquid slurry can be made to have a more uniform thickness over the substrate surface by means of, for instance, doctor blading or by a similar approach which also removes the excess slurry from the surface of the substrate. If desired, the application process may be repeated.

The slurry can be applied onto both the x-y (fiber) plane and onto the z (through-thickness) plane of two-dimensionally (2-D) woven oxide-based CMC fabric layups. The slurry can also be applied onto 2.5-D, 3-D and more complex woven oxide-based CMC fabric weaves and other non-composite substrates as previously described, e.g., onto alumina and silicon substrates. The slurry may be applied to form a single solid coating, without a bond coat, thus reducing time and expense and simplifying processing.

The slurry may then be consolidated on the substrate by annealing in a single annealing cycle comprising first annealing at ambient or room temperature, for example, in the range of about 15° C. to about 25° C. or at relatively low temperatures above ambient, for instance in the range of about 50° C. to about 200° C., in air, for times in the range of about one minute to about five hours, followed by a furnace annealing, at temperatures from about 200° C. to a maximum temperature of about 1000° C., preferably to a maximum temperature of about 800° C., for times in the range of about one to about twenty hours at the highest or maximum temperature, to form a solid, adherent, refractory, wear-resistant coating. The heating ramp rate during furnace annealing may be in the range of about 30° C./hour to about 200° C./hour. As used herein, the terms "consolidate", "consolidated" and "consolidating" mean forming a solid mass and a "single annealing cycle" means that no cooling is required between thermal treatments. The cooling ramp rate from the highest annealing temperature may be, for example, in the range of about 10° C./hour to about 100° C./hour.

In accordance with exemplary embodiments of the present invention, the solid, adherent, refractory, wear-resistant coating has a thickness ranging from about 5 µm to about 500 µm. The solid coating provides higher resistance to wear than the uncoated oxide-based CMC substrate surface. The coating comprises a terminal oxide or oxides, and thus is not thermodynamically prone to further oxidation under most conditions.

While particular annealing steps have been described, the invention is not so limited. For example, the entire thermal annealing sequence from room temperature to the highest annealing temperature, for example 1000° C., may be carried out in one furnace enclosure. Additionally, lamps emitting at various wavelengths, such as infra-red lamps, may be used to anneal the substrates or components, and lower or higher maximum furnace temperatures may be used taking into account the maximum recommended temperatures for each of the materials in the substrate and/or coating. The use of lamps or even solar concentrators can enable facile application and annealing of these types of coatings in non-laboratory conditions, e.g., in the field, and for purposes of component repair.

A sanding or polishing step may be introduced after the coating has been partially or completely annealed and consolidated to produce a coated substrate surface having a predetermined flatness and/or roughness.

Figure 3:
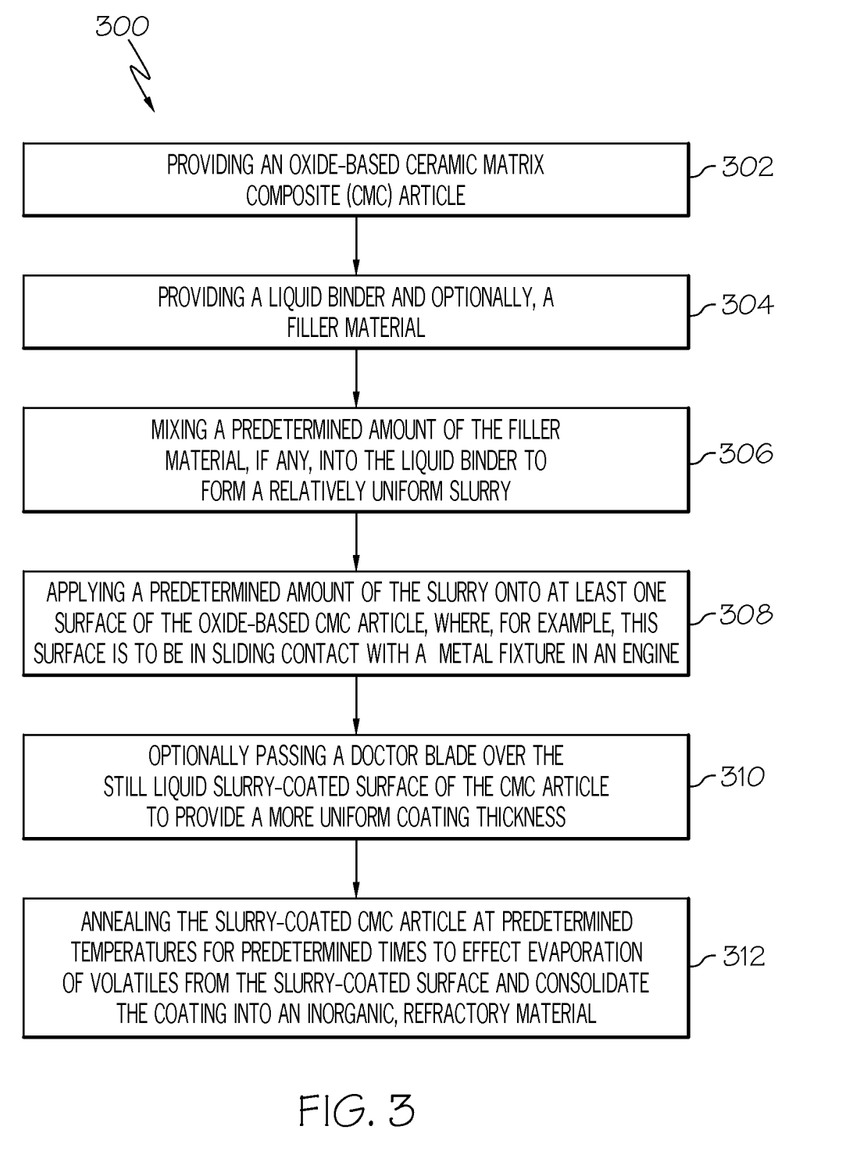
FIG. 3 is a simplified schematic flow diagram illustrating the method steps of fabricating a coated oxide-based ceramic matrix composite (CMC) article possessing reduced wear rate when in sliding contact against a metal surface.

The use of a coating precursor comprising a liquid slurry to form the solid coating instead of vapor-phase coating deposition methods (for example, electron-beam evaporation, sputtering, thermal or plasma spray, chemical vapor deposition, etc.) enables greater control over the coating composition and thickness of the coating to satisfy compatibility requirements, i.e., sufficient adhesion over the required temperature range, thermal expansion properties similar to those of the oxide-based CMC substrate, chemical compatibility with the thermal and oxidizing environment, ability for application in the required thickness range and onto both planar and more complex-shaped surfaces, use of relatively available and low-cost chemical components and precursors, use of relatively low cost instruments and fixtures, and a straightforward and time efficient application and annealing cycle. Use of a slurry-based precursor for the coatings substantially reduces damaging pressure and temperature shocks to the substrate that may be experienced by the substrate during thermal or plasma spray, for example. This slurry-based application methodology helps preserve the integrity, structure, and mechanical properties of the substrate. In addition, the slurry method is relatively simple and does not require complex and expensive equipment. The slurry method also enables the deposition of a coating that is thicker than several micrometers and as thick as hundreds of micrometers in a single application and annealing cycle, thus saving time, increasing process efficiency and decreasing cost. In addition, a slurry-based coating is typically more environmentally friendly relative, for example, to precursors and byproducts encountered in chemical vapor deposition. It is to be appreciated, however, that the substrate may be coated by vapor-phase coating deposition methods The above-described steps for a method 300 of fabricating a coated oxide-based ceramic matrix composite (CMC) article possessing reduced wear rate when in sliding contact against a metal surface can be summarized as shown in the flow diagram of FIG. 3. More specifically, step 302 is providing an oxide-based ceramic matrix composite (CMC) article. Step 304 is providing a liquid binder and optionally, a filler material. Step 306 is mixing a predetermined amount of the filler material, if any, into the liquid binder to form a relatively uniform slurry. Step 308 is applying a predetermined amount of the slurry onto at least one surface of the oxide-based CMC substrate, where this surface is to be in sliding contact with a metal fixture in an engine, for example. Step 310 is optionally passing a doctor blade over the still liquid slurry-covered surface of the CMC substrate to provide a more uniform coating thickness. Step 312 is annealing the slurry-covered CMC substrate at predetermined temperatures for predetermined times to effect evaporation of volatiles from the coated surface and consolidate the coating into an inorganic, solid refractory material.

The present invention is further described in detail through the following examples. However, the scope of the present invention is by no means restricted or limited by the examples which only have an illustrative purpose.

EXAMPLES

Materials

The oxide-based CMC substrates comprised 2-D layups of 3M Nextel™ 720 (alumina-mullite) woven fabric comprising continuous fibers, and a porous alumina matrix. Most of the 2-D fabric layups comprised layers positioned in sequential 0/90° orientations, and some layups comprised layers positioned in sequential +45/−45° orientations. The substrates were flat plates and had a typical thickness of about 3.2 mm (⅛ inch). Some substrates were 6 mm (about ¼ inch) thick. Most of the coatings were applied on the x-y (fiber or fabric plane) surfaces of the oxide-based CMC substrates and some coatings were applied on the z (through-thickness) plane surfaces.

Several liquid binders were used, including the Aremco™ Cerama-Bind™ 642 sodium silicate liquid binder and the Aremco Pyro-Paint™ 634-AL (a basic colloidal alumina solution) liquid binder. The filler material was alumina powder of two different particle sizes, 3 micrometers and 15 micrometers, in various weight ratios of powder to liquid binder in the range of zero to three. The sodium silicate binder (with or without filler material) is preferred for the coating due to superior adhesion to oxide-based CMC surfaces. Slurries were prepared by mixing a measured amount of powder with a measured amount of liquid binder to obtain predetermined powder to liquid binder weight ratios. Mixing was done at ambient temperature. Homogenization was performed by stirring manually and/or by means of a magnetic stirrer bar immersed in the slurry and rotated via a magnet stirrer plate. Homogenization times were typically between 2 and 15 minutes. After homogenization, the slurry was applied at ambient temperature, by brush painting, onto the surface of the oxide-based CMC substrates and other substrates used for comparison, such as dense ceramic alumina and crystalline silicon substrates.

In some of the experiments, the thickness and thickness uniformity of the still liquid slurry coating was both better controlled and improved by means of a doctor blade system. While commercial doctor blade instruments are available, the doctor blade assembly used in these examples was designed and assembled from generally available materials and components. The doctor blade assembly consisted of a razor blade mounted on a horizontal translation stage with a micrometer controllable height above the substrate. The substrate was held stationary and with its surface substantially parallel to the direction of translation of the edge of the blade. While the specific doctor blade assembly used in the experiments described herein was intended for flat substrates, similar concepts and instruments may be used to achieve similar results for non-planar substrates, e.g., a cylindrical surface, as in a shroud employed in airplane engines.

The slurry-covered substrates of the present examples were then annealed at ambient room temperature in air for about an hour, followed by additional annealing in air on a hot plate at about 90-200° C. (200-400° F.) for about 1 to 3 hours, so as to remove volatiles, and then followed by a furnace annealing in flowing air at one atmosphere at a maximum temperature of about 800° C. (or 1500° F.) for about 1-10 hours. The heating ramp rate for the furnace annealing was on the order of 60-150° C./hour. The maximum annealing temperature was chosen as a convenient value, sufficiently high to ensure all volatiles are removed and the coatings are consolidated. No controlled atmosphere environments or vacuum chambers were used or necessary in this process. After the maximum temperature annealing step was completed, the furnace was allowed to cool by natural (not forced) processes, with the coated substrates in flowing air. The coated substrates were then removed when the temperature was below about 100° C. Following this type of annealing sequence, solid, adherent and wear-resistant coatings were thereby produced on the oxide-based CMC substrates.

The solid coatings on the oxide-based CMC substrates were examined microscopically at different magnifications, and their areal densities, thicknesses and thickness distributions were measured by means of weight changes and digital micrometer measurements of the thicknesses of the coated vs. uncoated substrates. The coatings had average thicknesses in the range of about 25 to about 500 micrometers. In general, while good and complete coverage of the substrates was achieved over a wide thickness range, using the relatively simple experimental methods and equipment as described, there were some residual thickness variations in these coatings. The nominal coating thickness was calculated from the measured coating areal density (e.g., in units of mg/cm$^2$) and an assumed volumetric coating density equal to that of dense alumina. The actual volumetric coating density was likely lower than that of dense alumina, and also varied somewhat among coatings, due to the different liquid binders used and different powder to liquid ratios. Thus, the actual average thicknesses were higher than the above nominal values calculated as described. Additionally, direct values of the coating thickness distributions were calculated from the differences between the thicknesses of coated and uncoated substrates, performed by means of a digital micrometer. These directly measured values provided de-facto maximum or peak coating thicknesses. These maximum values were about 2-4 times higher than the average values obtained from areal densities as described above.

Testing Methods

Wear rate was determined by a tribometer. A tribometer is an instrument that measures friction and wear rate of materials. The commercial tribometer used in these measurements operated in a tab-on rotating-disk mode and was controlled by means of a personal computer. The load, track diameter on a Haynes 188 metal alloy disk, angular disk velocity (and thus linear velocity), distance traveled, and temperature were controlled. Approximately 6×6 mm pieces (tabs) of coated and uncoated oxide-based CMC substrates were cut on a diamond saw from the larger plates for the purpose of measuring the wear rate. The coatings on these oxide-based CMC pieces were deposited on the x-y (fabric) plane of the substrates. The wear rates of uncoated x-y (fabric) surfaces of oxide-based CMC substrates of the same dimensions were measured as reference and the results shown are typical. Wear rate measurements were done against Haynes 188 metal alloy at ambient temperature or about 25° C. (75° F.), at about 300° C. (570° F.), and at about 650° C. (1200° F.), in ambient air. As is known, machining and sawing of materials causes localized heating. In addition, sliding friction and contact between two surfaces causes localized heating. The temperature as referred to herein denotes the temperature in the proximate environment or enclosure surrounding the tab and disk, and does not include such additional localized heating.

As noted, the wear geometry was a flat, stationary, uncoated or coated oxide-based CMC tab in contact with a rotating Haynes 188 disk. Typically each wear test run covered a total distance of 300 m to 10,000 m and consisted of 3 to 11 segments of increasingly longer distances. The specific number of segments and specific distances depended on the measured wear rates. The mass and dimensions of the oxide-based CMC tab were measured at the start and end of each segment, and the appearance of the tab wear surface and other tab surfaces were examined microscopically and photographed at the same time. The mass of the Haynes 188 disk and the lateral dimensions of the wear track on the disk surface were measured and documented at the start and end of each wear test run. Additionally the surface roughness of the unworn Haynes 188 disk and of the wear track were also measured by means of a stylus profilometer. The as-machined Haynes surfaces had a surface roughness of about 0.13 μm to about 0.20 μm (5-8 microinch) $R_a$, and the sandblasted surfaces had a surface roughness of about 0.56 μm to about 0.97 μm (22-38 microinch) $R_a$. Wear rate measurements were performed mostly on sandblasted Haynes surfaces, and some measurements were done on as-machined surfaces. Prior to wear testing, the Haynes 188 disk surface was cleaned with organics, such as ethanol, and blown dry. The oxide-based CMC tabs were degreased with organics after being cut on the diamond saw, then dried in air on a hot plate at about 100-200° C. for about 1-4 hours, and allowed to cool down to room temperature by natural (not forced) processes. The surfaces of the oxide-based CMC tabs were then blown with a nitrogen or air gun prior to wear testing. Each oxide-based CMC was tested on a fresh track surface of a Haynes 188 disk.

As noted above, due to variations in coating thickness, at the start of each wear test the coating surface had "high" regions or asperities which were the first to contact the Haynes 188 disk. It was observed that these asperities in the coating became black with increasing wear distance, due to a small amount of metal worn and transferred from the Haynes 188 disk. By documenting and measuring the surface area of the coating in contact with the disk, it was possible to calculate the effective average pressure load in each segment, from the nominal known weight load. The thus calculated initial, actual loads were, in some cases, over ten times higher than the nominal loads, where each of the latter was simply equal to the known applied weight divided by the total tab area. As wear distance increased, the fraction of the coating surface which turned black increased, and the corresponding calculated actual loads decreased, eventually approaching or being equal to the nominal loads. In the case of uncoated oxide-based CMC tabs, the starting surface was also not flat, due to the built-in waviness in the two-dimensionally woven oxide fiber-tow plies, so a similar situation prevailed. However, the wear rates of uncoated oxide-based CMC tabs were higher by one to two orders of magnitude compared to the wear rates of Cerama-Bind™ 642 coated oxide-based CMC tabs. Additionally, as already noted, the wear rates of uncoated oxide-based CMC substrates varied dramatically over two orders of magnitude during a wear test, as an entire ply became partially worn and eventually completely worn. At room temperature, there was not an identical transfer of worn oxide-based CMC particulates onto the Haynes 188 disk, as the transfer of black metal from the disk onto the tab, but rather such oxide particulates could be observed on the edge of the Haynes 188 disk (but not within the track) after the completion of each wear segment. In some cases of wear tests performed at nominally 650° C., embedded alumina material was observed in portions of the wear track on the surface of the Haynes 188 disk. One reason for the latter effect may be softening of the Haynes 188 alloy at this higher temperature, with respect to alumina in the tab.

The nominal coating thickness for each tab was calculated from the measured coating areal density (in e.g., mg/cm$^2$) for the larger piece of material from which the wear tab was machined, and an assumed volumetric coating density equal to that of dense alumina.

The coated substrates were indirectly tested for adhesion of the coating to the oxide-based CMC substrate. Excellent adhesion was demonstrated if no delamination occurred after all of the following testing stages: during annealing at or close to room temperature after initial application of the slurry; following higher temperature furnace annealing at 800° C.; during or following diamond-saw cutting of the coated substrates; and during or following lengthy wear-rate measurements with the tribometer, the last two tests taking place at nominal and/or actual elevated temperature. If delamination took place following application of the slurry to the oxide-based CMC substrate, or during subsequent annealing, further testing was discontinued. If the coatings were adherent after such annealing and during various handling operations, then coated substrates were further machined as described and wear tested. If delamination was observed during machining or in relatively early stages of wear testing, then the adhesion of the coating to the oxide-based CMC substrate was determined to be less than excellent, but such coatings may still be sufficient in less harsh mechanical applications than those previously described, or in other applications.

Results

Excellent adhesion was obtained with a slurry-based coating comprising the Cerama-Bind™ 642 liquid binder, both without and with alumina powder filler material.

Tables 1 and 2 provide examples of measured wear rates of uncoated and coated oxide-based CMC substrates, both in terms of thickness losses and in terms of mass losses. Table 1 presents the results of wear tests of coated and uncoated oxide-based CMC substrates against sandblasted Haynes 188 disks, performed nominally at room temperature (20° C.), linear velocity of 0.8 m/s, and a nominal load (as described previously) of 2 N (8 psi). Several uncoated oxide-based CMC substrates were tested and the results shown are typical. Table 1 is as follows:

188 disks (after the end of each multi-segment wear test). The average thickness losses were measured directly for the oxide-based CMC substrates, from the thickness distributions across each substrate after each wear segment. In the case of those Haynes 188 disks wear tested at room temperature, the overall average thickness losses were calculated from the measured mass losses and the measured lateral dimensions of the track, using the measured (and known) volume density of Haynes 188. The wear within a track on the Haynes 188 disks was not entirely uniform, as observed visually and microscopically (circular sub tracks) and by measuring the surface roughness with a stylus profilometer instrument in the radial and circumferential directions. As noted, oxide-based CMC tabs were measured after each distance segment, whereas Haynes 188 disks were measured at the start and completion of an entire wear test sequence, incorporating all segments.

In the case of the wear measurements performed at 650° C. (Table 2), some oxidation of the Haynes 188 disk occurred during the wear test, as observed visually by a light green coloration. This oxidation resulted in gains of weight and thickness for the Haynes 188 disk, partially masking the corresponding wear-induced losses of the Haynes 188 disk, so that only the values measured for the oxide-based CMC substrate are reported. A separate exposure of an as-machined, unworn Haynes 188 disk was carried out in a tem-

TABLE 1

| Coating | Nominal coating thickness (μm) | Total distance (m) | Total (coating and Oxide-based CMC) mass loss per unit distance at end of run or at indicated distance (μg/m) | Total (coating and Oxide-based CMC) thickness loss per unit distance at end of run or at indicated distance (μm/m) | Ratio of (coating and Oxide-based CMC) to Haynes mass losses | Area-normalized ratio of (coating and Oxide-based CMC) to Haynes thickness losses |
|---|---|---|---|---|---|---|
| CB1-a | 89 | 4,000 | 0.48 | 0.055 | 0.079 | 2.96 |
| CB1-b | 89 | 4,000 | 0.35 | 0.046 | | |
| | | 10,000 | 0.53 | 0.026 | 0.073 | 1.16 |
| CB0.5 | 36 | 4,000 | 0.32 | 0.024 | 0.075 | 1.76 |
| CB0.4 | 40 | 4,000 | 0.45 | 0.018 | 0.059 | 0.78 |
| CA0.5 | 61 | 4,000 | 0.65 | 0.017 | 0.048 | 0.41 |
| C | 24 | 4,000 | 2.55 | 0.0005 | 0.29 | 0.02 |
| Uncoated | | 600 | 61.83 | 0.560 | 2.03 | 5.94 | wherein:
The letter "A" following the letter "C" signifies that the alumina powder filler material had a powder particle size of ~15 micrometer.
The letter "B" following the letter "C" signifies that the alumina powder filler material had a powder particle size of ~3 micrometer.
The slurry for the coating denoted "C" did not include any powder filler material.
The number following "CA" and "CB" denotes the powder to liquid binder weight ratio in the slurry.
The letters "a" and "b" in the first two rows denote two different coated substrates as indicated.

Table 2 presents the results of wear tests of a coated oxide-based CMC substrate against sandblasted Haynes 188 disk, performed nominally at an elevated temperature of 650° C., linear velocity of 0.8 m/s, and at a nominal load of 2 N (8 psi).

TABLE 2

| Coating | Nominal coating thickness (μm) | Total distance (m) | Total (coating and Oxide-based CMC) mass loss per unit distance at end of run (μg/m) | Total (coating and Oxide-based CMC) thickness loss per unit distance at end of run (μm/m) |
|---|---|---|---|---|
| CA0.4 | 38 | 4,000 | 0.10 | 0.007 | wherein:
The letter "A" following the letter "C" signifies that the alumina powder filler material had a particle size of ~15 micrometer.
The number following "CA" denotes the powder to liquid weight ratio in the slurry.

The mass losses were measured directly for both oxide-based CMC substrates (after each wear segment) and Haynes perature-controlled, three-zone tube furnace at 650° C. for five hours in flowing dry air, resulting in the same light green coloration and an increase in weight. In contrast, the oxide-based CMC substrates were not chemically affected by exposure to air at 650° C.

It can be seen from the results in Tables 1 and 2 that the wear-induced mass losses per unit distance for these coated oxide-based CMC substrates were lower by a factor of 100-200 at room temperature, and lower by a factor of 600 at 650° C., compared to the mass loss of the uncoated oxide-based CMC substrate. The corresponding wear-induced thickness losses per unit distance for these coated oxide-based CMC substrates were lower by a factor of 10-33 at room temperature, and by a factor of 80 at 650° C., compared to the thickness loss of the uncoated oxide-based CMC substrate.

Additionally, the total distance traveled by the uncoated substrates was about 6-17 times shorter than traveled by the coated substrates. The wear tests of uncoated oxide-based CMC substrates were stopped earlier than the wear tests of coated oxide-based CMC substrates due to severe material loss of the uncoated substrates.

For comparison of the thickness losses of either coated or uncoated oxide-based CMC substrates to thickness losses of the corresponding Haynes 188 disks, the large difference in the worn surface areas needs to be taken into account, as the track areas on the Haynes disks were much larger than the areas of the oxide-based CMC tabs. Thus Table 1 includes a column with the area-normalized ratios in thickness losses, where the average calculated thickness loss of each track on the Haynes disks was multiplied by the ratio of the track surface area divided by the area of the oxide-based CMC tab. Comparing now the wear-induced thickness losses of either coated or uncoated oxide-based CMC substrates to the thickness losses of the corresponding Haynes 188 disks, where the latter were normalized to the same nominal contact area as described, it is seen that the highest relative losses were measured in the uncoated oxide-based CMC substrate. The relative losses in the coated oxide-based CMC substrates were lower, and provide a means to rank different slurry-based coatings in terms of their effectiveness in reducing and preventing wear-induced dimensional changes. Some slurry-based coatings presented with lower relative thickness losses than the corresponding Haynes disks.

Comparing the wear-induced mass losses of either coated or uncoated oxide-based CMC substrates to mass losses of the corresponding Haynes 188 disks, the mass losses can be compared directly. It is seen that the uncoated oxide-based CMC substrate lost about twice the mass of the Haynes disk. By contrast, the coated oxide-based CMC substrates lost significantly less mass, in fact a factor of 25-42 times less, than the corresponding Haynes 188 disk for each wear test. This attests to the excellent wear-reducing and protective properties of these slurry-based coatings on the oxide-based CMC substrates.

As noted above, the actual contact area between the coated oxide-based CMC tabs and the Haynes 188 disk increased with wear distance traveled. As an example, for the substrate denoted as "CB1-a" in Table 1, the actual contact area increased from about 10% to 70% from segment No. 1 to segment No. 11. Thus, in this substrate, the effective, segment-averaged pressure load decreased from about 85 to 12 psi during the wear test, compared with the nominal 8 psi load. It is quite likely that the initial contact area at the very start of wear contact was significantly lower than the 10% measured at the end of the first segment, with a correspondingly much higher initial effective load. Plotting the change in mass and thickness of the coated oxide-based CMC tabs vs. wear distance traveled in contact with the Haynes 188 disk, the values of both mass and thickness losses correspondingly decreased with distance. This effect is believed to be due in large part to the increasing contact area, as just described, resulting in decreasing effective pressure load. It was independently measured that the wear rate increased with increased nominal load, as expected. Note that the real loads prevailing in an actual wear situation in a real component may differ from those in the laboratory measurements, but the trends and relative wear rates are expected to be the same or very similar.

While the amount of wear test data measured at nominally ambient temperature exceeded the amount of data measured at 650° C., it is believed, based on these measurements and other factors as noted below, that similar results can be expected for other slurry-based coatings of the same or similar compositions at 650° C. and even higher temperatures. The oxide-based CMC substrates and the materials contained in the slurry-based coatings are terminal oxides and are not expected to undergo compositional changes in air with increasing temperature up to at least 1000° C. and even higher. The Haynes 188 alloy is expected to develop oxidation-induced surface oxide layers with increasing temperature in air, as already measured at 650° C. These layers may include $Cr_2O_3$ and other oxides, and thus the wear rate of the surface-oxidized Haynes 188 disks when in contact with the coated oxide-based CMC substrates may change with temperature. The oxide-based CMC substrates and the coatings, as well as the Haynes 188 disk are expected to become softer with increasing temperature, and this may also affect the wear rate.

Oxide-based CMC substrates coated with slurry-based oxide coatings, and specifically slurry-based coatings employing the Aremco Cerama-Bind™ 642 liquid binder with various amounts of alumina powders, thus evidence reduced wear rate of such coated oxide-based CMC substrates in sliding contact with Haynes 188 alloy disk by one to over two orders of magnitude, as compared to uncoated oxide-based CMC substrates. This effect occurs over a range of at least 2.5 to 1 in powder to liquid weight ratios, and even for a neat binder without powder, and for powders having a range of at least a factor of 5 in average particle size (3 to 15 micrometer). These coatings present with remarkably high adhesion to the oxide-based CMC substrate surface, which is very beneficial in any coating, but especially so for the purpose of reducing wear. Even the neat (i.e., without powder filler material) slurry-based coating ("C") which presented with microcracks, had very low wear. Microcracks in this particular coating were probably due to a mismatch in thermal expansion coefficients between the neat coating and the oxide-based CMC substrate.

The ability to reduce wear-induced dimensional changes, such as loss of thickness and loss of mass, of coated oxide-based CMC components is very important in the ability of such components to be used in critical applications, such as for aircraft engine shrouds and other components and systems of industrial, commercial and military importance. Replacement of conventional airborne articles (such as those made from much higher density superalloy metals) with articles made from oxide-based CMC substrates enables an airborne system to be more fuel efficient and to fly longer ranges, by reducing its overall weight and permitting its operating temperature to be increased.

From the foregoing, it is to be appreciated that the adherent, protective coatings are chemically and thermally compatible with oxide-based CMC substrates and with the environment over a wide temperature range. The coatings may be applied on planar or complex-shaped substrate surfaces. The coatings are amenable to be applied in the required thickness range in a single application and with a thermal annealing cycle carried out at relatively moderate temperatures. The coatings are made and applied using relatively simple and available materials, laboratory utensils, equipment, and environments. The coatings result in a significant reduction in CMC wear rates when in sliding contact with Haynes 188 or similar metals at temperatures up to 1000° C. and greater.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A coated article adapted to be subjected to direct and sustained mechanical contact consisting essentially of:
   an oxide-based ceramic matrix composite (CMC) substrate comprising fibers embedded in a matrix; and
   a wear-resistant solid coating disposed directly on an external contact surface of the substrate and adhering to the substrate during such direct and sustained mechanical contact, the wear-resistant solid coating discrete from the substrate and formed from a precursor consisting essentially of a solid metal-oxide powder having a particle size of about 0.001 µm to about 100 µm and a liquid binder comprising a sodium silicate.

2. The coated article of claim 1, wherein the coated article comprises a shroud of a gas turbine engine component.

3. The coated article of claim 1, wherein the oxide-based ceramic matrix composite substrate comprises fibers selected from the group consisting of alumina, alumina-mullite, zirconia, hafnia, yttrium-aluminum-garnet (YAG), and silica fibers, and combinations thereof.

4. The coated article of claim 1, wherein the weight ratio of the solid metal-oxide powder to liquid binder is between 0 to about 5.

5. The coated article of claim 4, wherein the solid metal-oxide powder is selected from the group consisting of an alumina powder, a non-alumina oxide powder, and combinations thereof.

6. The coated article of claim 1, wherein the oxide-based CMC substrate is an alumina-based CMC substrate and the solid metal-oxide powder comprises alumina.

7. The coated article of claim 1, wherein the wear-resistant solid coating comprises a single layer about 5 µm to about 500 µm in thickness.

8. A coated oxide-based ceramic matrix composite substrate, consisting essentially of:
   an oxide-based ceramic matrix composite substrate comprising fibers selected from the group consisting of alumina, alumina-mullite, zirconia, hafnia, yttrium-aluminum-garnet (YAG), and silica fibers, and combinations thereof; and
   a wear-resistant solid coating formed from a slurry consisting essentially of a solid metal-oxide powder having a particle size of about 0.001 µm to about 100 µm and a liquid binder comprising a sodium silicate, the wear-resistant solid coating disposed directly on the substrate and adhering thereto during direct and sustained mechanical contact, the wear-resistant solid coating having a thickness ranging from about 5 µm to about 500 µm.

9. The coated oxide-based ceramic matrix composite substrate of claim 8, wherein the solid metal-oxide powder is selected from the group consisting of alumina powders, non-alumina oxide powders, and combinations thereof.

10. The coated oxide-based ceramic matrix composite substrate of claim 9, wherein the liquid binder comprising the sodium silicate comprises sodium metasilicate hydrate and the weight ratio of the solid metal-oxide powder to sodium metasilicate hydrate comprises between 0 to about 5.

11. A method of improving the wear resistance of an article comprised of a ceramic matrix composite substrate, the method comprising the steps of:
   providing a substrate comprised of an oxide-based ceramic matrix composite (CMC) including fibers embedded in a matrix; and
   covering the substrate with a slurry consisting essentially of:
   a liquid binder comprising a sodium silicate; and
   consolidating the slurry to form a wear resistant solid coating on the article, the wear resistant solid coating disposed directly on an external contact surface of the substrate and adhering to the substrate during direct and sustained mechanical contact, the wear resistant solid coating discrete from the substrate.

12. The method of claim 11, further comprising the step of:
   mixing a filler material with the liquid binder, the filler material selected from the group consisting of alumina powders, chopped alumina fibers, non-alumina oxide powders and chopped non-alumina oxide fibers, and combinations thereof.

13. The method of claim 12, wherein the step of mixing the filler material with the liquid binder comprises mixing in a weight ratio of filler material to liquid binder of between 0 to about 5.

14. The method of claim 12, wherein the step of consolidating the slurry comprises annealing the slurry-covered substrate.

15. The method of claim 12, wherein the step of consolidating the slurry comprises forming the wear resistant solid coating having a thickness range of about 5 µm to about 500 µm.

16. A coated article adapted to be subjected to direct and sustained mechanical contact consisting essentially of:
   an oxide-based ceramic matrix composite (CMC) substrate comprising fibers embedded in a matrix; and
   a wear-resistant solid coating disposed directly on an external contact surface of the substrate and adhering to the substrate during such direct and sustained mechanical contact, the wear-resistant solid coating discrete from the substrate and formed from a consolidated slurry precursor consisting essentially of a liquid binder comprising a sodium silicate.

17. The coated article of claim 16, wherein the oxide-based ceramic matrix composite substrate comprises fibers selected from the group consisting of alumina, alumina-mullite, zirconia, hafnia, yttrium-aluminum-garnet (YAG), and silica fibers, and combinations thereof.

18. The coated article of claim 16, wherein the wear-resistant solid coating comprises a single layer about 5 µm to about 500 µm in thickness.

19. The coated article of claim 16, wherein the coated article comprises a shroud of a gas turbine engine component.

* * * * *